Aug. 14, 1956

D. L. CURTIS 2,758,905

MAGNETIC RECORDING APPARATUS

Filed Jan. 29, 1951

INVENTOR.
Daniel Lee Curtis
BY
Lippincott & Smith
ATTORNEYS

United States Patent Office 2,758,905

Patented Aug. 14, 1956

2,758,905

MAGNETIC RECORDING APPARATUS

Daniel Lee Curtis, Manhattan Beach, Calif., assignor to The Regents of the University of California, Berkeley, Calif., a corporation of California Application January 29, 1951, Serial No. 208,380

3 Claims. (Cl. 346—74)

This invention relates to the recording of information as magnetic dipoles on sheet material. It is applicable to such recording of speech or music, but its particular value lies in the recording of information as coded pulses such as are employed in electronic computers of the digital type.

The recording, in a phonographically reproducible manner, of information of various kinds by means of magnetic dipoles or charges impressed on permanently magnetizable materials is approximately fifty years old. Originally such recordings were made upon steel wire or tape, although occassionally recording was done on extended sheets of material even in the early days of the art. Fairly recently there has been increasing use of thin sheets of paper or plastic covered with an adherent layer of finely ground oxides of iron as the recording material. Various oxides and mixtures of oxides have been used for this purpose, including both those in which the oxide used was primarily the recognized magnetic oxide or magnetite and those in which the predominant composition is represented by the formula $Fe_2O_3$. What ever the composition used, however, it has had the characteristic that as compared with ordinary soft iron its permeability is relatively low and its coercive force high; i. e., the material used requires a relatively high magnetizing force to form dipoles upon it but once the particles of material are alined to form such dipoles they retain a large portion of the alinement and require an equally large or larger magnetizing force to destroy the alinement and thus wipe out the magnetic record formed upon the medium.

In all types of magnetic recording, whether upon wire, tape, or sheet, various orientations of the dipoles with respect to the medium have been employed. Some of the earliest patents show recording heads having pole pieces bearing against opposite sides of a wire record in such manner that the dipoles would be formed almost directly transverse to the axis of the wire. Customarily, however, even in the earliest wire recorders, the pole pieces of the recording heads were relatively displaced slightly longitudinally of the axis of the wire and the direction of motion thereof.

Certain early recorders using tape or sheet material employed recording heads having pole pieces positioned on opposite sides of the sheet in such manner that the resulting dipoles would be disposed substantially normal to the surface of the recording medium. This, of course, limits the construction of the apparatus and the dimensions of the recording medium to those which will permit the medium to be inserted between the two pole pieces and to retain the latter accurately in alinement. For many purposes this limitation is a serious one, and where sheet material is used (the term sheet being considered to include tape as a special case) a much more usual arrangement is to move the sheet past a recording head having both of its pole pieces on the same side of the sheet. In this case the recording head normally comprises a ring or loop of magnetic material, forming a core upon which is wound a coil carrying a current representative of the information to be recorded, the core being interrupted by a narrow gap between the pole pieces. The gap may be an actual air gap or it may be a shim of brass, bronze, or other non-magnetic material. In making the record the length of the gap may not be too important, but in reproducing such records the length of the gap becomes very critical as limiting the frequencies which may be reproduced at any given speed of record and gaps of from 0.005″ to 0.00025″ are frequently employed. The dimension of the gap perpendicular to the direction of the motion of the record is not so important, but where very short gaps are used, in order to record high frequency, great care must be employed to have the recording and reproducing gaps alined in precisely the same azimuth with respect to the direction of motion of the medium in order to avoid loss of high frequency components in recording. When recording heads of this latter type are used the direction of the dipoles is generally parallel to the direction of motion.

The oxide coated magnetic media have many advantages. They are light, relatively cheap, and are capable of receiving and retaining recordings of a very high quality. In the form of sheets, particularly, a large amount of information may be stored upon a sheet of relatively small size. When used as "memory" devices in computing equipment such sheets may be wound upon drums and a record formed either circularly or helically thereupon. Alternatively, for this use the paper backing may be disposed with and the magnetic oxide deposited directly upon the surface of the drum, the recordings being magnetically erased when they have served their purpose.

Neither of such constructions, however, conveniently permits the use of recording heads having pole pieces upon opposite sides of the sheet of recording medium, particularly as the pole pieces must be accurately alined and maintained in such alinement. Therefore it has generally been the custom to use a technique wherein the dipoles are disposed substantially parallel to the surface of the medium.

This latter technique is not, however, that best suited to recording sharp pulses of very short duration in close juxtaposition, and it is evident that the closer the spacing of the dipoles on the path of the recording head along the record the more information can be packed into a given space and the smaller the equipment may be.

The broad purpose of this invention is to provide a means for recording information upon sheet material in the form of vertical dipoles, that is, dipoles whose axes are generally normal to the surface of the medium. Among the objects of the invention pursuant to this broad purpose are to provide a means for recording such dipoles from one side only of the medium used; to provide a means for so recording pulses of extremely short duration at relatively low record speed; to provide means for limiting response of the equipment, either in recording or for reproduction, to the specific area of the record wherein it is desired that the dipoles be formed, so that a "cell" of dipoles of small dimension, representing an extremely short pulse, will not be affected by adjacent cells of opposite polarity with a consequent reduction in response to the desired pulse, and, generally, to provide a rugged and stable recording mechanism which is capable of recording a maximum of information upon a minimum area of recording medium without degradation of the quality of the record formed.

Considered broadly a mechanism of my invention comprises an asymmetric recording head comprising a core of relatively high permeability, low retentivity material provided with two pole pieces, one of which is sharply tapered or pointed so as to present to the recording medium an area of a few square mils at most while the other presents to the record a relatively large area which may be hundreds, or, preferably, many thousand times that of the pointed pole piece. Means are provided for supporting a sheet of the recording medium in close juxtaposition to these pole pieces, and the latter are shaped and spaced to conform to the surface of the recording medium when so supported, being spaced therefrom by a few thousandths of an inch at most or even with the pole pieces in light actual contact therewith. The support for the medium or record is provided with a surface layer of high permeability material. This may be permanently secured to the support, interposed between the support and the medium, or even applied as a metallic backing to the medium itself if the latter be a paper of film separate from the support. Preferably this layer comprises material of the highest possible permeability for relatively low magnetizing forces, the nickel- and cobalt-bearing alloys such as are marketed under the trade names of "Permalloy" or "Mu-Metal" being desirable for this purpose. There is also preferably provided a magnetic shield which also quite closely conforms to the surface of the medium when carried upon its support. This shield is provided with an aperture through which the apex of the smaller pole piece has access to the recording medium. For maximum effectiveness the thickness of this shield at the opening should be as small as possible, and the spacing of the edges of the opening as presented to the sharp pole piece should be greater than the spacing of the latter from the surface of the high permeability backing layer but not over one order of magnitude greater, the purpose being to intercept by the shield any fringing fields due to cells of dipoles other than those immediately below the pointed pole piece and at the same time offer a relatively high reluctance path between the pointed pole piece and other portions of the record surface or to leakage back to the core of the recording head.

With the construction as specified the path of lowest reluctance, which will therefore be followed by the greatest proportion of the flux generated by the magnetizing coil, will be directly dowward through the oxide coating of the medium and into the high permeability layer immediately below. From this point back through the larger pole piece and to the coil the reluctance is very low indeed, due to the very large area and to the high permeability of the support layer and the core. In this path even the return air gap between the high permeability support layer and the extended or blunt pole piece offers little reluctance, its cross sectional area being, as stated, preferably several thousand times as great as that presented by the sharp pole piece. Therefore, although the total return flux is, of course, equal to that under the more concentrated pole, it is so widely distributed and hence its intensity is so low that it has no discernible effect upon the magnetic state of the medium. Practically all of the energy supplied by the magnetizing coil is expended in the medium directly below the pointed pole piece and the efficiency of the device is therefore very high. Furthermore, because of the distribution of the return flux over the area of many cells of dipoles, its effect cancels out in the long run and, somewhat surprisingly, the noise level and "cross-talk" caused thereby are not appreciably greater in magnitude than those occurring with recording heads of the conventional type where only the recording flux is permitted to traverse the medium.

The above will be clearer in connection with the accompanying drawings wherein.

Figures 1, 2, 3:
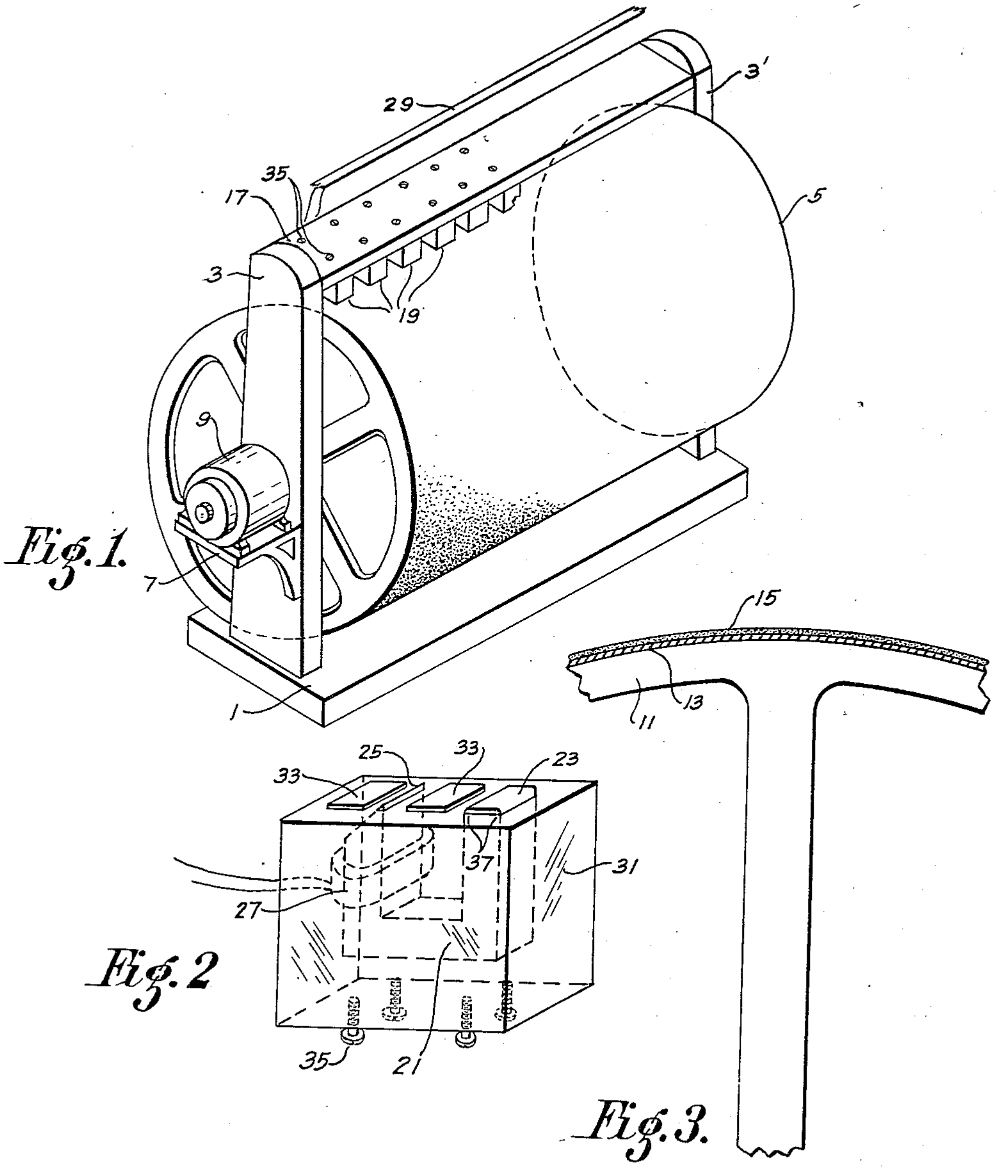
Fig. 1 is a diagrammatic isometric view of a single drum type recorder in accordance with the invention.
Fig. 2 is an isometric showing of a recording and reproducing head.
Fig. 3 is a diagrammatic view of a portion of the periphery of a drum as used in the recorder of Fig. 1 with the recording medium permanently deposited directly thereupon.

An embodiment of the invention as applied for use as a memory device in a high speed electronic digital computer is indicated in Fig. 1. In this case a base 1 is supplied with a pair of columns 3, 3' which carry bearings (not shown) in which a drum 5 is journaled. A bracket 7 on the column 3 carries a motor 9 which drives the drum at rather high speed, peripheral speeds of 2,000 inches per second being not uncommon in magnetic memory devices. Because of the high speeds used the drums should be accurately journaled and carefully balanced dynamically in order to avoid vibration insofar as this is possible, and for like reasons the drum is preferably of a light metal such as aluminum or magnesium alloy.

A section of the periphery of the drum is shown in Fig. 3. The cylindrical shaft 11 is covered with a layer 13 of highly permeable material, such as pure soft iron or, preferably, a nickel cobalt alloy of the "Permalloy" class. This layer or shell may be formed as a sleeve, heat treated to normalize it after forming, and then shrink-fitted over the drum proper. One method of accomplishing this is to cool the latter in Dry Ice or liquid air, slip it inside the sleeve, and then permit it to expand to a tight fit within the magnetic layer as it reaches room temperature. Alternatively, the high permeability layer may be formed of the powder of one of the high permeability materials mentioned, sprayed on to the drum in a suitable vehicle or binder.

Over the high permeability layer there is deposited, preferably by spraying, a magnetic layer 15 of relatively low permeability but high coercive force, preferably consisting of one of the magnetizable iron oxides which have already been mentioned in a vehicle or binder.

Secured to the columns 3 and 3' above the drum is a strip or beam 17 which carries the recording heads 19. The number of these heads may be quite large; as many as two hundred or more may be employed in a computer of large capacity. Each head serves to record or reproduce a single group of data of such length as can be recorded in a single track around the periphery of the drum.

While the peripheral speed of the drum is purposely made high so that access may be had to any particular group of previously recorded data in a very short time it is, of course, desirable that as large an amount of data be recorded in a given surface area as possible. In recordings of this character speed is a relative matter; digital computers may handle a very large number of pulses in a very short time and the pulses themselves may be of the order of a microsecond in length. To record a large amount of data upon the drum of limited circumference it is desirable that the distances between the pulses as recorded be as short as possible while still retaining a clear cut character, which means that while the absolute speed at which the record is progressed beneath the recording and reproducing heads is high it should still, in terms of lineal advance per pulse, be as slow as possible. The structure of the heads of this invention is designed to accomplish this.

One preferred structure is illustrated in Fig. 2. Each head comprises a high permeability ferromagnetic core 21, shaped, generally, like the letter U. The end of one leg of the U is substantially flat, as is shown at the reference character 23 to form an extended pole piece. The other leg of the U terminates in a knife or chisel edge 25 to form the active or recording pole piece. It would also be possible, within the scope of this invention, to bring the end of the pole piece 25 to a needle point. A knife edge construction is preferable as giving a much greater strength of signal and a better signal to noise ratio.

One or both legs of the U-shaped core 23 is surrounded by a coil 27 which carries the pulses to be recorded or reproduced by the head. The terminals of these coils may be brought out separately or may be combined into a cable 29 as shown in Fig. 1.

For convenience in mounting the heads I prefer to embed them completely in a block 31 of some plastic. This can be one of the thermo-setting plastics such as Bakelite or it can be a thermo-plastic such as methyl methacrylate. The pole piece 23 may be flush with the surface of the plastic block. The pole piece 25 may also be flush but I prefer to allow it to project slightly as indicated in the drawing.

Highly satisfactory recordings and reproduction can be achieved with the head exactly as has been thus far described. I prefer, however, to provide a shield or shields 33 of high permeability material closely adjacent to the active recording pole piece 25. These shields may be either on top of or embedded in the plastic, so that the knife edge 25 is either just flush with their outer surfaces or very slightly below them.

The face of the block 31, including the pole faces and shields, is shown in the drawing as being substantially flat. Because of the relatively small size of the recording heads and the large radius of the drum this is satisfactory, but if desired the surface may be made slightly concave so that it conforms to the periphery of the drum.

All of the heads are mounted to the beam 17 by suitable adjusting screws 35, so that the spacing between the pole pieces and the surface of the drum can be accurately adjusted. For certain types of recording, particularly when replaceable records are used, it is desirable that the sharp pole piece actually contact the recording medium. For electronic computer service, however, where the same recording surface is used over and over again and where, if contact recording were used, the wear would be material, it is better that a minute air gap be left between the pole pieces and the surface of the medium. In the case of the sharp pole piece 25 the gap should be as short as possible, preferably of the order of .001″ or .002″. The pole piece 23, however, may be spaced more widely from the medium, an air gap of .005″ to .010″ in this locality making adjustment easier. It is to be understood, of course, that the head is shown in Fig. 2 upside down with respect to its actual mounting as indicated in Fig. 1.

It will be seen that when recording heads are mounted as thus described each head has a magnetic circuit through the core 21, the sharp pole piece 25, the short air gap between that pole piece and the high coercive force, low permeability recording layer 15 to the high permeability layer 13, and from this layer back through the layer 15 and air gap to the blunt or extended pole piece. The disparity in area between the two pole pieces may be very large indeed, the cross-section of the extended pole piece perhaps 1,000 times as great as that of the sharp recording pole piece 25. Owing to this disparity there is a very high concentration of flux below the sharp pole piece, causing sharp and well defined cells of dipoles to be formed in this area. Under the extended pole piece the flux intensity is not only two or three orders of magnitude less but it is diffused over a wide area corresponding to many cells of dipoles as recorded under the sharp pole piece. Assuming the ratio of areas of the two pole pieces as being 1,000 to 1, any noise or cross-talk which might be introduced by the formation of dipoles under the extended pole piece would be about 60 decibels below the recorded level. In addition to this many pulses are recorded by the active pole during the time that any individual area corresponding to the record wavelength of a single pulse is passing beneath the extended pole piece. The average level of magnetization produced beneath the extended pole therefore tends to average out, still further reducing the level of the cross-talk or noise. What residual cross-talk does tend to occur is that developed at the extreme edges of the extended pole piece, and this can be substantially entirely eliminated by rounding the edges of the latter, as is shown at the reference character 37.

It has been mentioned that in the preferred method of operation the recording pole 25 is spaced slightly from recording medium. This results in some spreading of the magnetic field and loss of sharpness in the recording. Furthermore, if the data to be recorded are in the form of pulses of different lengths or of opposite sign, the fringing effects, when reproduction is attempted, serve to reduce the amplitude of recorded short pulses in comparison with those of longer duration. This effect is greatly reduced by the use of the shields 33. These shields are so placed that their minimum distance from the pole piece 25 is slightly greater than the normal separation of the knife edge of the pole from the recording medium but within one order of magnitude thereof. The shields therefore tend to divert and short circuit the fields which fringe the portion of the record which is "seen" by the recording or reproducing pole and the result is greatly to increase the sharpness of the reproduced pulses and to raise their amplitude to substantially the same level, more or less irrespective of their length.

It is obvious that the size of the shield must not be sufficient to cause an effective magnetic short circuit between the pole pieces 23 and 25; the reluctance of any path through the shields must be kept high in comparison with the reluctance through the recording medium and its high permeability backing. This is not difficult to accomplish since the shields will operate satisfactorily even though their thickness be limited to a mil or less and their spacing from the extended pole 23 may be many times that. Since they offer no complete magnetic circuit they do not increase the fringing from the active pole during the recording operation and in reproduction they sharply limit such fringing as has already been described.

Experiment has shown that with recording heads of this type the cells of the dipoles produced are substantially perpendicular to the surface of the medium and that, with careful adjustment, the number of cells which can be recorded on a unit length of track is equal to or greater than the number that can be produced longitudinally of the medium by recording heads of the more conventional form. Furthermore, heads of the type here described gain their maximum efficiency and usefulness where recording is done without having the heads or pole pieces in actual contact with the medium. The efficiency of the heads producing longitudinal dipoles falls off much more rapidly with separation from the medium than does that of heads employing my invention.

The particular form of this invention chosen for illustration has been selected primarily because of its simplicity and adaptability to illustration. Many possible modifications which fall within the scope of the invention as conceived and defined by the following claims will be apparent to those skilled in the art.

I claim:

1. Apparatus for recording electrical waves on a magnetic record sheet of relatively low permeability and high coercive force, which comprises a support for said sheet including at least a surface layer of relatively high permeability material, a recording head comprising a magnetic core of relatively high permeability material terminating in two pole pieces shaped to conform closely to the same surface of said sheet when on said support, one of said poles terminating in a sharp tip, the other terminating in a surface of many times the area of said tip to provide a flux path through said core, said record sheet, said support layer and returned through said record sheet to said core, with relatively high flux density in said path through said record sheet beneath said tip and low flux density beneath said other pole piece, and a shield of relatively high-permeability material positioned substantially parallel to said support above the record sheet when the latter is positioned thereon and having an aperture therein through which said tip projects.

2. Apparatus in accordance with claim 1 wherein said shield is less than ten mils in thickness.

3. Apparatus in accordance with claim 1 wherein the spacing of the edges of said aperture from said pole piece is greater than but within one order of magnitude of the spacing of said pole piece from said support.

References Cited in the file of this patent

UNITED STATES PATENTS

| | | |
|---|---|---|
| 2,089,287 | Molloy | Aug. 10, 1937 |
| 2,185,300 | Hickman | Jan. 2, 1940 |
| 2,229,293 | Huntley et al. | Jan. 21, 1941 |
| 2,431,541 | Camras | Nov. 25, 1947 |
| 2,436,829 | Roth | Mar. 2, 1948 |
| 2,501,126 | Howell | Mar. 21, 1950 |
| 2,540,654 | Cohen et al. | Feb. 6, 1951 |
| 2,546,850 | Chancenotte | Mar. 27, 1951 |
| 2,550,803 | Goddard | May 1, 1951 |
| 2,592,652 | Buhrendorf | Apr. 15, 1952 |

FOREIGN PATENTS

| | | |
|---|---|---|
| 512,766 | Great Britain | Nov. 30, 1937 |